(12) United States Patent
Hall et al.

(10) Patent No.: US 7,984,520 B2
(45) Date of Patent: Jul. 26, 2011

(54) WATER CLOSET

(76) Inventors: David R. Hall, Provo, UT (US); Boyd Black, Provo, UT (US)

( * ) Notice: Subject to any disclaimer, the term of this patent is extended or adjusted under 35 U.S.C. 154(b) by 451 days.

(21) Appl. No.: 12/169,098

(22) Filed: Jul. 8, 2008

(65) Prior Publication Data

US 2010/0005584 A1    Jan. 14, 2010

(51) Int. Cl.
*A47K 4/00* (2006.01)
*E03C 1/01* (2006.01)

(52) U.S. Cl. .................... 4/663; 4/664

(58) Field of Classification Search .......... 4/663–665, 4/662, 550, 645, 449, 615, 420, 604, 626, 4/448, 484, 312, 431; 52/34; D23/274
See application file for complete search history.

(56) References Cited

U.S. PATENT DOCUMENTS

| | | |
|---|---|---|
| 717,533 A | 1/1903 | Brandt |
| 1,385,262 A | 7/1921 | Nebel |
| 1,660,709 A * | 2/1928 | Hodgson ............ 4/665 |
| 2,527,271 A * | 10/1950 | Levin ............ 4/312 |
| 2,716,757 A | 9/1955 | Eriksson |
| 2,795,193 A | 6/1957 | Linscott |
| 2,801,426 A | 8/1957 | La Gorce |
| 2,817,094 A * | 12/1957 | Lessley ............ 4/645 |
| 3,456,264 A | 7/1969 | Flagg |
| 3,737,107 A | 6/1973 | Wright |
| 4,091,473 A | 5/1978 | Matthews |
| 4,318,670 A | 3/1982 | Fechter |
| 4,561,136 A | 12/1985 | Baer |
| 4,830,585 A | 5/1989 | Ruyle |
| 5,067,186 A * | 11/1991 | Ayers ............ 4/665 |
| 5,230,109 A | 7/1993 | Zaccai |
| 5,636,391 A * | 6/1997 | Greene, III ........... 4/420.3 |
| 5,742,956 A * | 4/1998 | Tarver ............ 4/663 |
| 5,867,847 A | 2/1999 | Klawitter |
| 6,112,338 A | 9/2000 | Sundberg |
| 6,721,967 B2 * | 4/2004 | Braxton ............ 4/664 |
| 7,305,724 B2 * | 12/2007 | Rozental et al. ........... 4/665 |

* cited by examiner

*Primary Examiner* — Lori Baker

(74) *Attorney, Agent, or Firm* — Tyson J. Wilde; Philip W. Townsend, III

(57) ABSTRACT

A water closet has a wash basin positioned above a toilet which is secured to a floor. A guide is adapted to direct movement of the wash basin in a generally vertical direction.

19 Claims, 17 Drawing Sheets

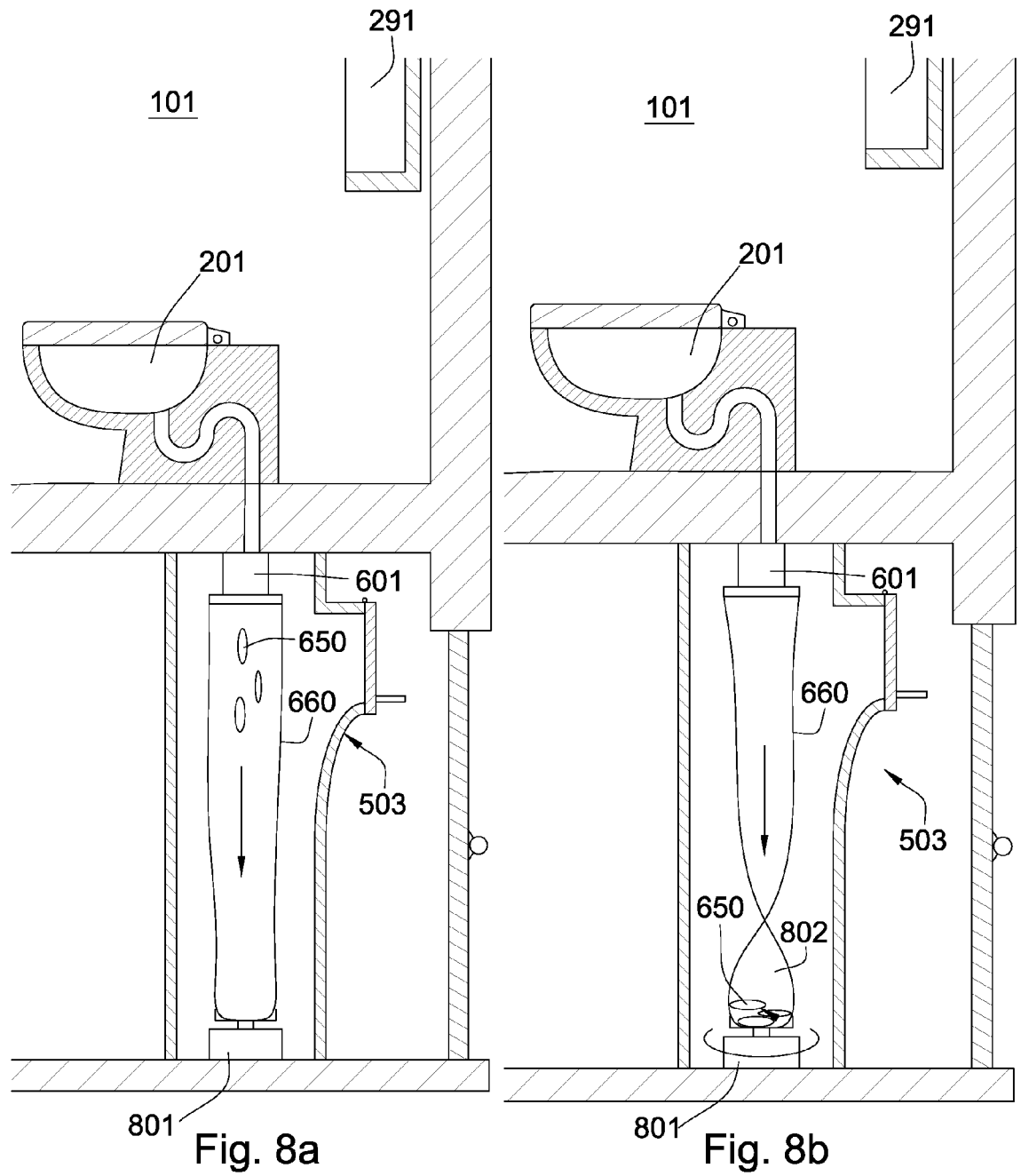

1600

Providing a cloth holder, a wash basin, an actuator adapted to move the wash basin and/or the cloth holder with respect to one another, at least one ultrasonic transducer adapted to transmit a wave through a liquid medium when disposed within wash basin, and a liquid medium disposed within the wash basin. 1601

Cloth is connected to the cloth holder. 1602

The actuator brings the wash basin and cloth holder together such that the cloth is disposed in the liquid medium within the wash basin. 1603

The at least one ultrasonic transducer is activated and transmits waves through the liquid medium cleaning the cloth. 1604

The actuator seperates the cloth holder and wash basin removing the cloth from the liquid medium. 1605

The cloth is dried and removed from the cloth holder. 1606

Providing a toilet disposed in a water closet and secured to the floor of the water closet, and a wash basin positioned above the toilet.
1701

Raising the wash basin to a height necessary for a person to sit on the toilet and underneath the wash basin.
1702

Flushing the toilet.
1703

Lowering the wash basin to a height disposed intermediate a shoulder and a torso of the person and adapted to allow the person to wash in the basin.
1704

Fig. 17

WATER CLOSET

BACKGROUND OF THE INVENTION

Many attempts have been made to decrease the footprint of a bathroom. Examples of such are disclosed in the following references:

U.S. Pat. No. 5,742,956 to Tarver, which is herein incorporated by reference for all that it contains discloses a modular bathroom unit configured for comfort and spaciousness, with a relatively small footprint. The preferred embodiment of the present invention includes a commode, shower with floor drain, and a relatively large lavatory, which is configured to pivot to a vertical position for space savings when not in use, or to a horizontal position for use. Further contemplated is a unique drain connection system, wherein the lavatory drain includes a drainpipe connection to a stationary drainpipe built into the wall structure of the unit, the connection accomplished without the requirement of hoses, pipe fittings or the like. The present invention provides a shower and toilet facility which may be utilized with no impositions or restrictions on the user, while the interior is configured to be watertight, with a sealed door, and an easily cleaned interior surface. The preferred embodiment of the present invention is fabricated as a one-piece, molded fiberglass unit, although other methods of manufacture may also be employed, with satisfactory results. The present system may be utilized as a stand alone, portable bathroom facility, or may be implemented in the form of a space saving bathroom, in a building or other structure, or in a camper, boat, or modular housing or the like, or any other location where a small, yet full-featured bathroom is desired.

U.S. Pat. No. 5,230,109 to Zaccai et al., which is herein incorporated by reference for all that it contains, discloses a vertically adjustable lavatory assembly includes an outer frame and a carrier frame positioned within the outer frame. The carrier frame is vertically movable within the outer frame and has a lavatory connected thereto. A lavatory is positioned outside the carrier frame and outer frame, and includes a faucet and a sink basin having an outlet opening therein. A drain line is in fluid flow communication with the sink basin outlet opening and a sewer line, and is adapted to accommodate for changes in the height of the sin basin. A plurality of supply lines are also adapted to accommodate for changes in the height of the basin.

U.S. Pat. No. 2,716,757 to Eriksson which is herein incorporated by reference for all it contains, discloses a lavabo of the type including a water basin, supporting means including means for vertically adjustably supporting the basin adjacent a wall and controllable supply conduit means and a discharge water conduit, the improvements comprising a water mixer fixed within the wall above the supporting means, said controllable supply conduit means including hot and cold water conduits fixed in the wall and communicating with the water mixer, a further conduit within the wall extending downwardly from said mixer and terminating in an outlet exteriorly of the wall at a point below the lowest vertical position of the basin, control cocks fixed to the wall for controlling the hot and cold water supply, a water tap fixed to the basin, an outlet pipe means carried by the basin and communicating with the discharge water conduit and a flexible pipe extending between the water tap and the said further conduit whereby the control of the supply of water to the basin remains at a fixed level while the water tap remains at a fixed level relative to the basin regardless of the vertically adjusted position of the basin.

BRIEF SUMMARY OF THE INVENTION

In one aspect of the present invention, a water closet has a wash basin positioned above a toilet which is secured to a floor. A guide is adapted to direct movement of the wash basin in a generally vertical direction.

At least one ultrasonic transducer may be disposed on the wash basin. The water closet may have a control loop adapted to obstruct a drain of the wash basin while the ultrasonic transducers are activated. The water closet may have a holder positioned above the wash basin. An actuator may be adapted to move the wash basin and the holder with respect to one another. At least one gear box may be disposed intermediate a rail of the guide and the actuator. The actuator may be a mechanical jack, a hydraulic jack, a motor, a crank or combinations thereof. A power source adapted to provide power to the actuator may be incorporated into the water closet. The power source may comprise a battery, a generator, a solar cell or combinations thereof.

The guide may comprise grooves of at least one wall of the water closet. A bench adapted to cover the toilet may be in communication with the guide and is adapted to be lifted vertically above the toilet.

The water closet may be adapted to function as stand alone building. The water closet may be incorporated into a spacecraft, a motorcraft, a watercraft, an aircraft, or combinations thereof. The water closet may be incorporated into a portable building, a residential dwelling, a commercial building, or combinations thereof.

The water closet may have a water pump adapted to transport water from a water reservoir disposed within the water closet to the wash basin and/or toilet. A waste reservoir may be disposed within the water closet and may be in communication with a drain of the wash basin and/or a drain of the toilet. A compressed gas canister may be disposed in the toilet and may be adapted to assist in flushing the toilet. The toilet may direct waste into a disposable receptacle. The water closet may be adapted to receive water from an outdoor water faucet. A water stopper may be placed in a lower half of an entrance to the water closet and is adapted to retain water within the water closet. A water barrier may be disposed in front of the toilet.

A method for using a water closet, may have the steps of providing a toilet disposed in a water closet and secured to the floor of the water closet, and a wash basin positioned above the toilet; raising the wash basin to a height necessary for a person to sit on the toilet and underneath the wash basin; flushing the toilet; and lowering the wash basin to a height disposed intermediate a shoulder and a torso of the person and adapted to allow the person to wash in the wash basin.

BRIEF DESCRIPTION OF THE DRAWINGS

FIG. 8a is a cross-sectional diagram of another embodiment of a waste disposal system of the water closet.

FIG. 8b is a cross-sectional diagram of another embodiment of a waste disposal system of the water closet.

FIG. 16 is a method of an embodiment for washing an object.

FIG. 17 is a method of an embodiment for using a water closet.

DETAILED DESCRIPTION OF THE INVENTION AND THE PREFERRED EMBODIMENT

Figure 1A:
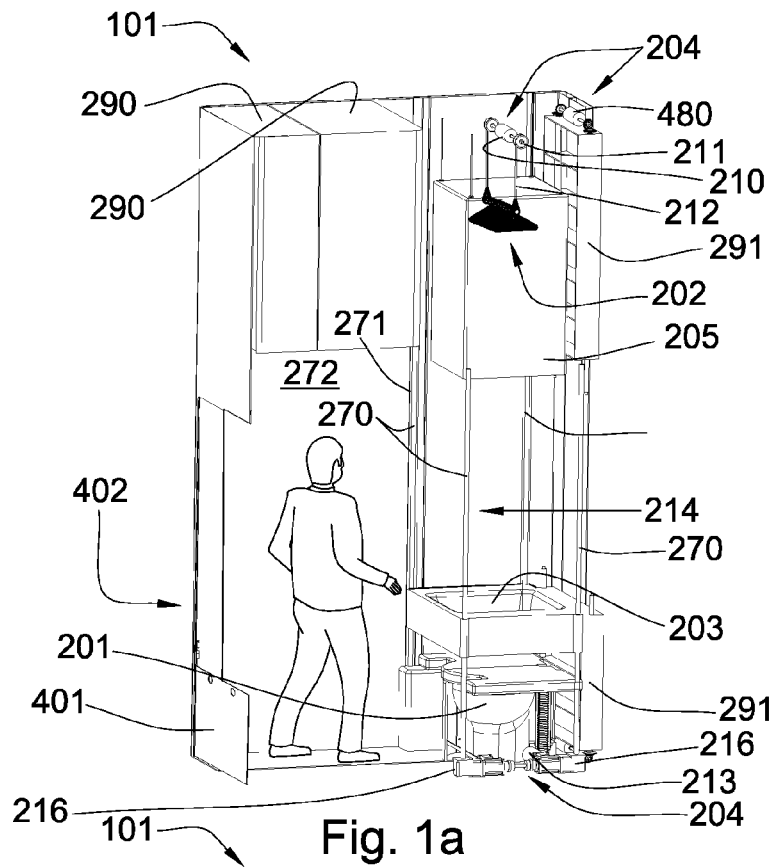
FIG. 1a is a perspective diagram of an embodiment of a water closet.
Figure 1B:
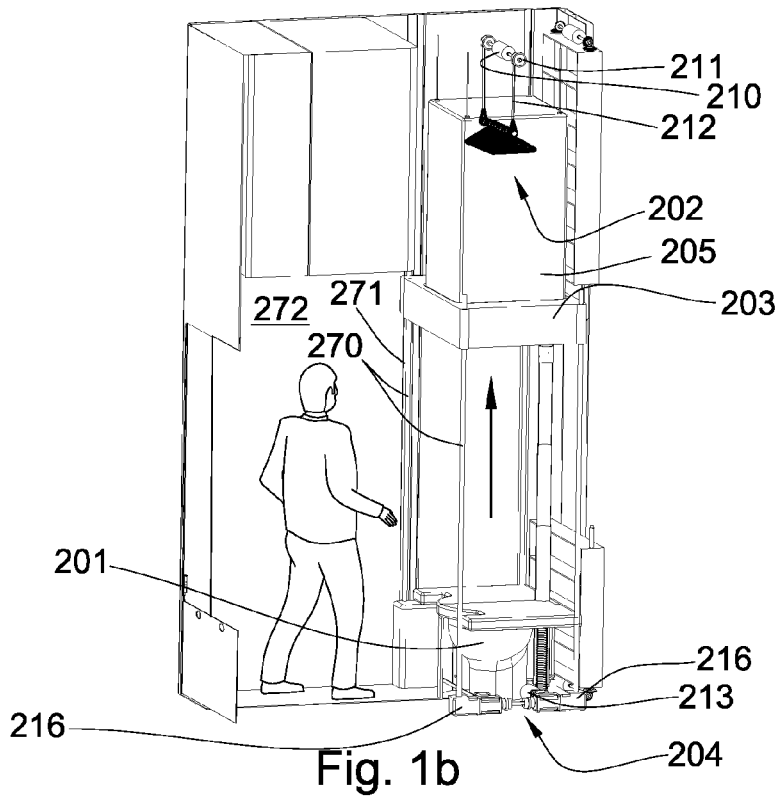
FIG. 1b is a perspective diagram of another embodiment of a water closet.
Figure 2A:
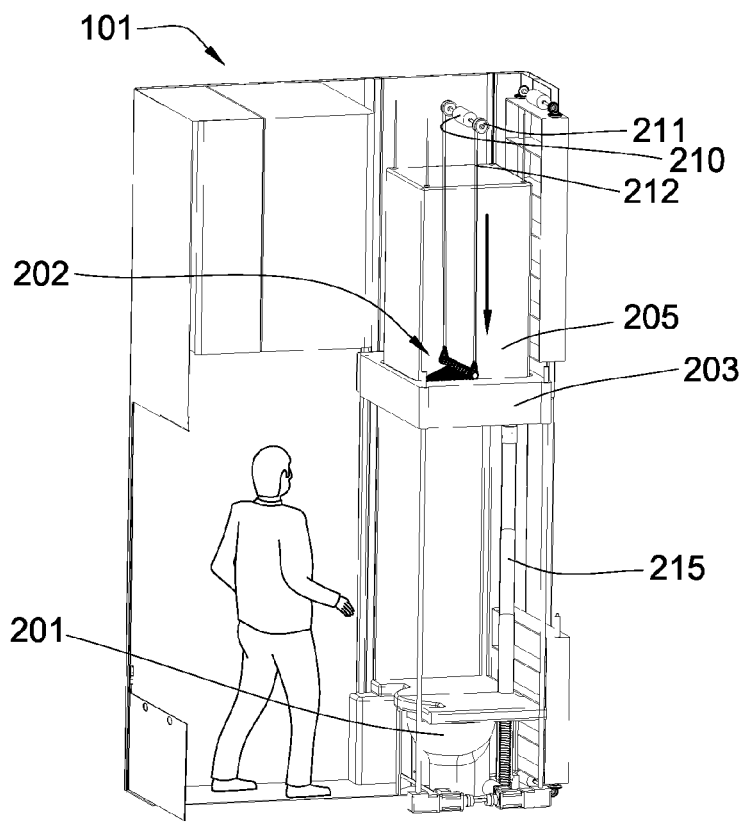
FIG. 2a is a perspective diagram of another embodiment of a water closet.
Figure 2B:
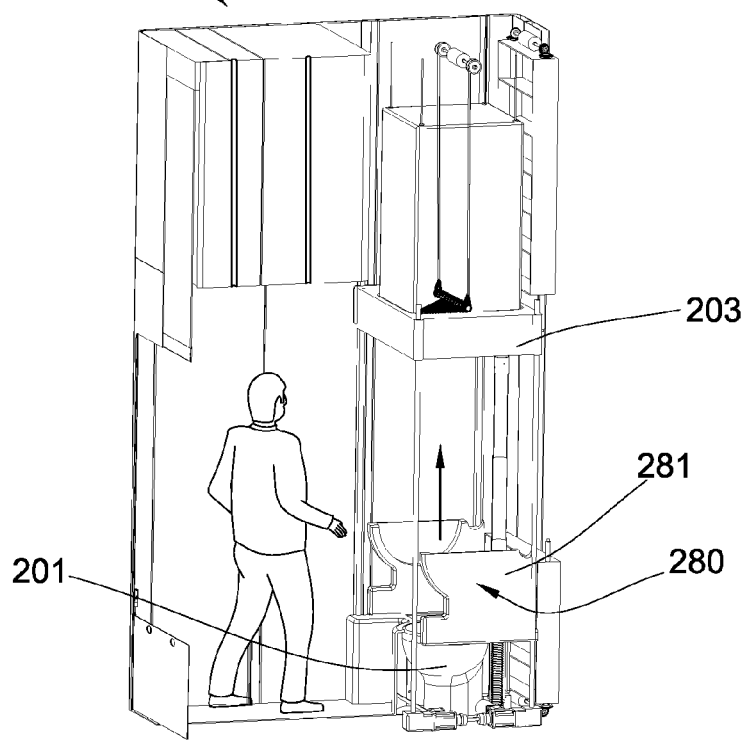
FIG. 2b is a perspective diagram of another embodiment of a water closet.
Figure 3A:
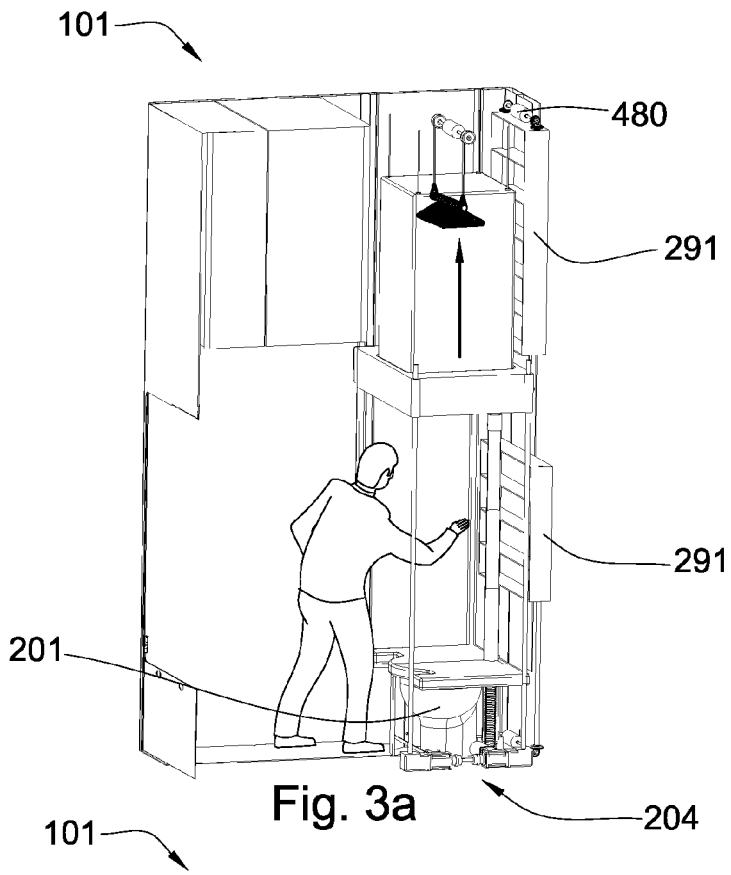
FIG. 3a is a perspective diagram of another embodiment of a water closet.
Figure 3B:
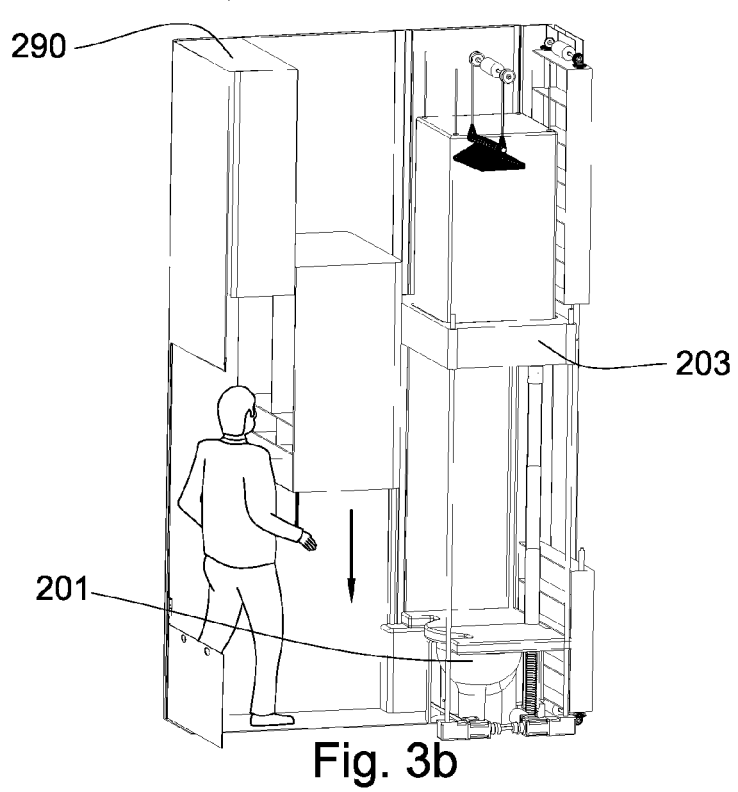
FIG. 3b is a perspective diagram of another embodiment of a water closet.

FIGS. 1a through 3b disclose a perspective diagram of the water closet 101. The water closet 101 may be incorporated into a portable building, a commercial building, a residential building or combinations thereof. The water closet 101 comprises a toilet 201 secured to a floor of the water closet 101 and a wash basin 203 positioned above the toilet 201. The water closet 101 may comprise a holder 202 positioned above the wash basin 203. The wash basin 203 comprises an open top 207, sides 208, and a closed bottom side 290 forming an open enclosure 209 adapted to retain a liquid medium 206 within the wash basin 203. The wash basin 203 may be a sink. The wash basin 203 may be adapted to be used as a bathroom sink. In some embodiments, the wash basin may be a washer or washer/dryer combination. In some embodiments, a washer and/or dryer is above the wash basin and can also move vertically.

The water closet 101 also comprises an actuator 204 adapted to vertically move the wash basin 203 with respect to the toilet 201. The actuator 204 may also be adapted to move the wash basin 203 and the holder 202 with respect to one another. The actuator 204 may raise the wash basin 203 to a height necessary for a person to sit on the toilet 201 and underneath the wash basin 203. After the toilet 201 has been used, the actuator 204 may lower the wash basin 203 to a height disposed intermediate a shoulder and a torso of the person and adapted to allow the person to wash in the wash basin 203. The embodiments of the actuator 204 disclosed in FIGS. 1a through 3b may comprise a first motor 210 that manipulates at least one winch 211. When the first motor 210 is activated, a cable 212 connected to the holder 202 at a first end of the cable 212 and connected to the winch 211 at a second end of the cable 212 is wound or unwound from the winch 211. The unwinding action of the cable 212 on the winch 211 lowers the holder 202 towards the wash basin 203 and the winding action of the cable 212 on the winch 211 raises the holder 202 away from the wash basin 203. The actuator 204 may also comprise a second motor 213 adapted to actuate a guide 214. The wash basin 203 may be disposed proximate the guide 214 and moves a long a length of the guide 214 as the second motor 213 actuates the guide 214. The guide 214 may comprise a rail 270. The rail 270 may be threaded. At least one gear box 216 may be disposed intermediate the rail 270 and the actuator 204. The embodiments of the water closet 101 disclosed in FIGS. 1a through 3b may comprise as many as four rails 270. Each of the four rails 270 is threaded and in communication with a gear box 216 and also may be in communication with a corner of the wash basin 203. Torque from the second motor 213 is transmitted to each gear box 216 where it is then transferred to the threaded rails 270. As the threaded rails 270 rotate the wash basin 203 is raised away from toilet 201 toward the holder 202 or is lowered toward the toilet 201 and away from the holder 202. The guide 214 may comprises grooves 271 of at least one wall 272 of the water closet 101 adapted to restrict the wash basin 203 to movement in a vertical direction. In the embodiments of FIGS. 1a through 3b the threaded rails 270 and the corners of the wash basin 203 may be adapted to be partially disposed within the grooves 271 thereby restricting the wash basin 203 to vertical movement. The wash basin 203 may comprise a drain 215. The drain 215 may comprise a valve 217 adapted to obstruct the drain 215. The drain 215 may be adapted to increase and decrease in length as the actuator 204 raises and lowers the wash basin 203. The water closet 101 may comprise a splash guard 205 adapted to cover the holder 202 and object 250 placed on the holder 202. The splash guard 205 may be adapted to retain the liquid medium 206 within the wash basin 203 as the holder 202 and object 250 enter and exit the liquid medium 206. The water closet 101 may comprise a bench 280 adapted to cover the toilet 201. The bench 280 may be two segments 281 adapted to pivot on the sides of the toilet 201. The water closet 101 may also comprise at least one cabinet unit 290 disposed in the upper half of the water closet 101 adapted to store clothing and/or supplies. The at least one cabinet unit 290 may be adapted to move up and down in the vertical direction. The water closet 101 may also comprise at least one shelf unit 291 disposed behind the toilet 201. The at least one shelf unit 291 may be adapted to move and down in the vertical direction. The actuator 204 may comprise a third motor 480 adapted to move the at least one shelf unit 291 up and down in the vertical direction with respect to the toilet 201.

Figure 4A:
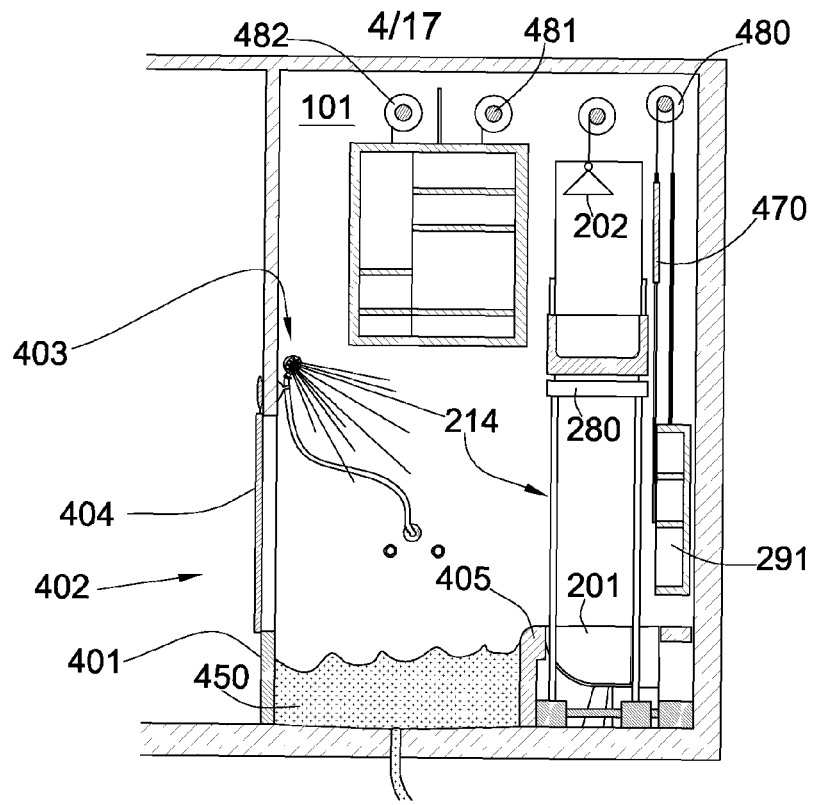
FIG. 4a is a cross-sectional diagram of another embodiment of a water closet.
Figure 4B:
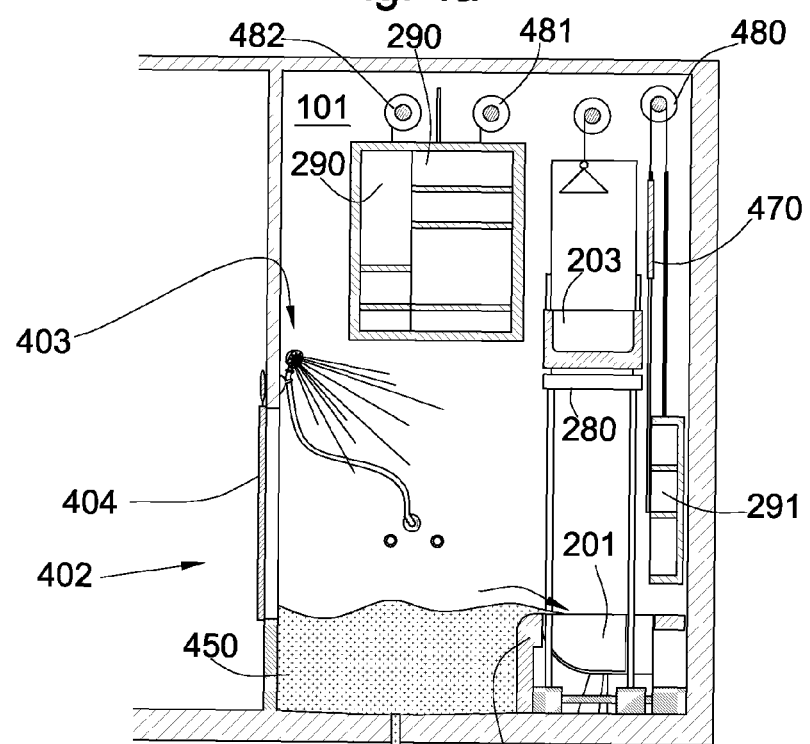
FIG. 4b is a cross-sectional diagram of another embodiment of a water closet.

Referring now to FIGS. 4a through 4b, the bench 280 adapted to cover the toilet 201 may be in communication with the guide 214 and may be adapted to be lifted vertically above the toilet 201. The water closet 101 may also comprise a mirror 470 disposed above the toilet 201. The mirror 470 may be adapted to move in the vertical direction with respect to the toilet 201. The third motor 480 may be adapted to vertically move the mirror 470 and the at least one shelf unit 291 in the vertical direction. The actuator 204 may comprise a fourth motor 481 and/or a fifth motor 482 adapted to move the at least one cabinet unit 290 in the vertical direction. A water stopper 401 may be placed in a lower half of an entrance 402 to the water closet 101 and may be adapted to retain water 450 within the water closet 101. It is believed that the water stopper 401 may be beneficial when using a shower 403 in that the retained water 450 may be used for bathing. The water closet 101 may also comprise a water-resistant door 403 also adapted to retain water 450 within the water closet 101 when using the shower 403. A water barrier 405 may be disposed in front of the toilet 201 and may be adapted to isolate the toilet 201 from the water 450 retained in the water closet 101 by the water stopper 401. Water 450 that has been retained by the water stopper 401 may be directed and drained into the toilet 201 so as to prevent the water 450 from flowing over the water stopper 401 and out of the water closet 101.

Figure 5:
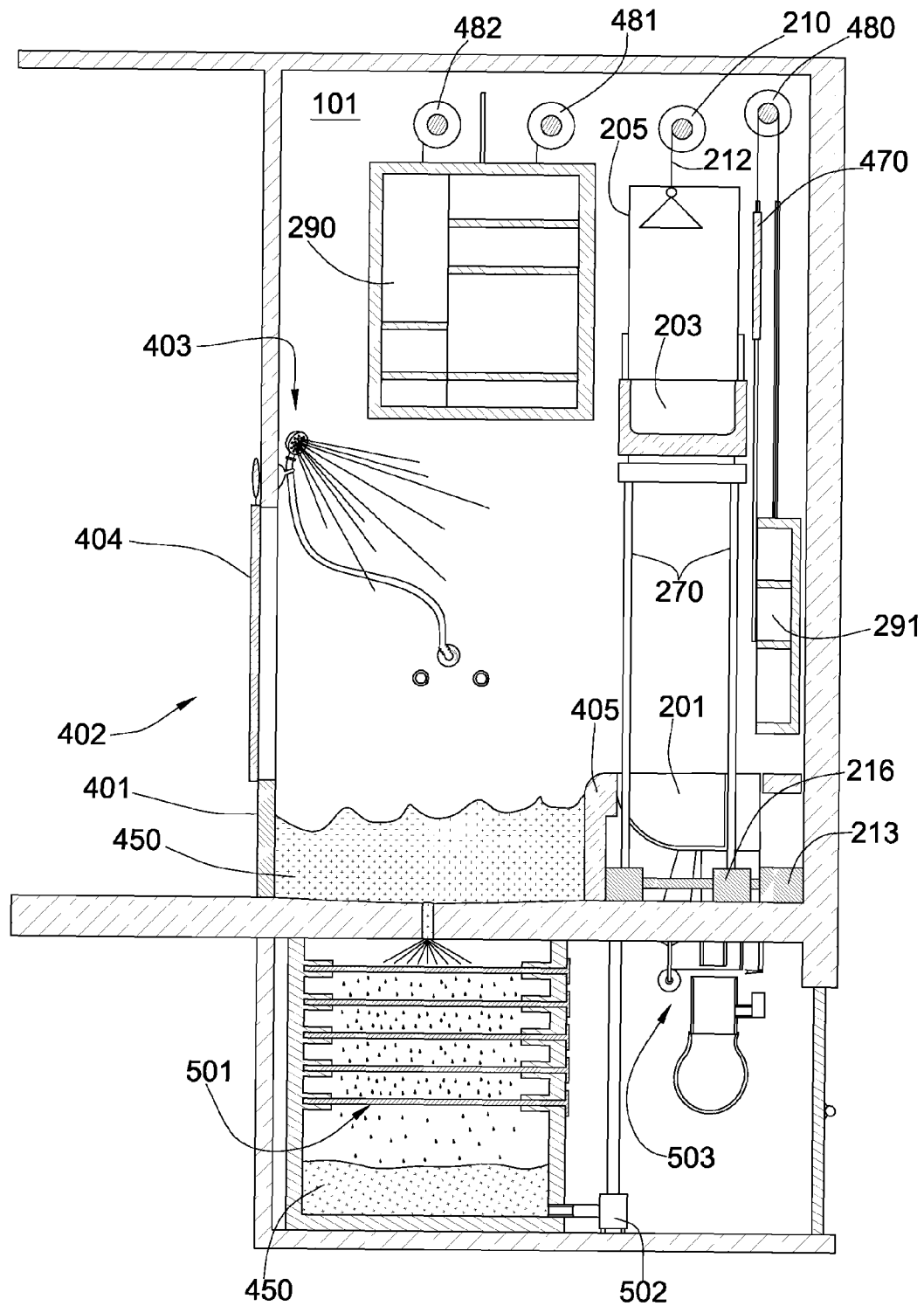
FIG. 5 is a cross-sectional diagram of another embodiment of a water closet.
Figure 6A:
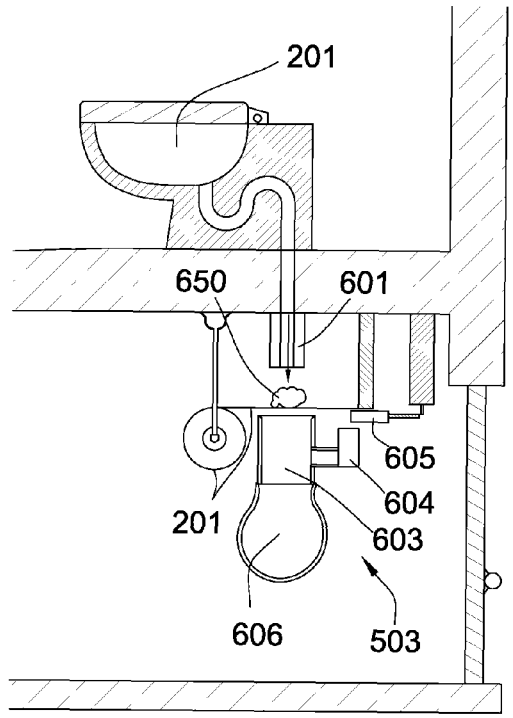
FIG. 6a is a cross-sectional diagram of an embodiment of a waste disposal system of the water closet.
Figure 6B:
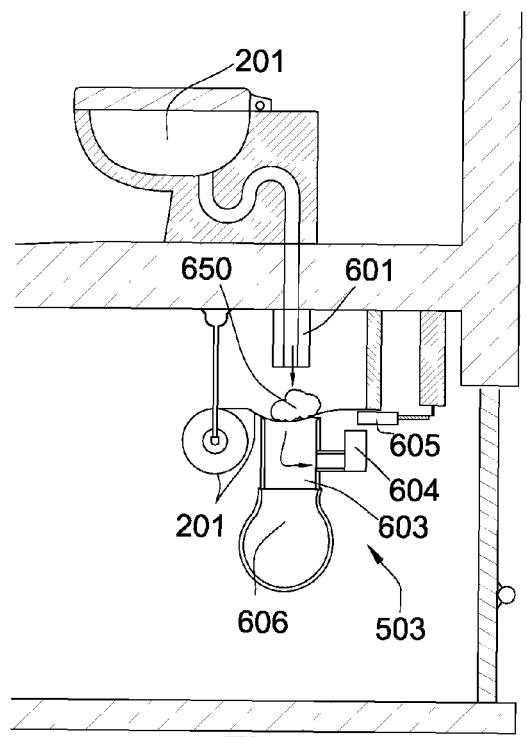
FIG. 6b is a cross-sectional diagram of another embodiment of a waste disposal system of the water closet.
Figure 6C:
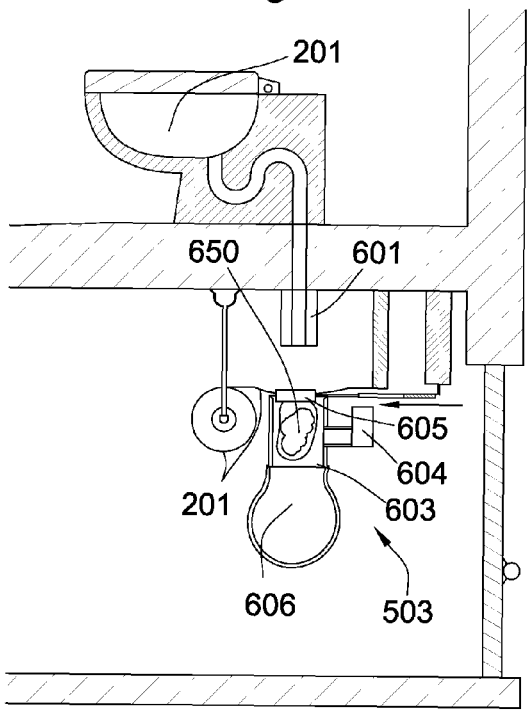
FIG. 6c is a cross-sectional diagram of another embodiment of a waste disposal system of the water closet.
Figure 6D:
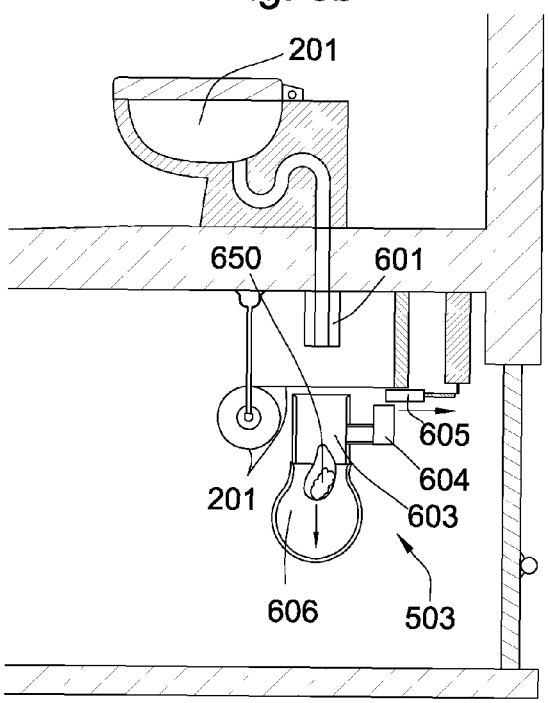
FIG. 6d is a cross-sectional diagram of another embodiment of a waste disposal system of the water closet.
Figure 7A:
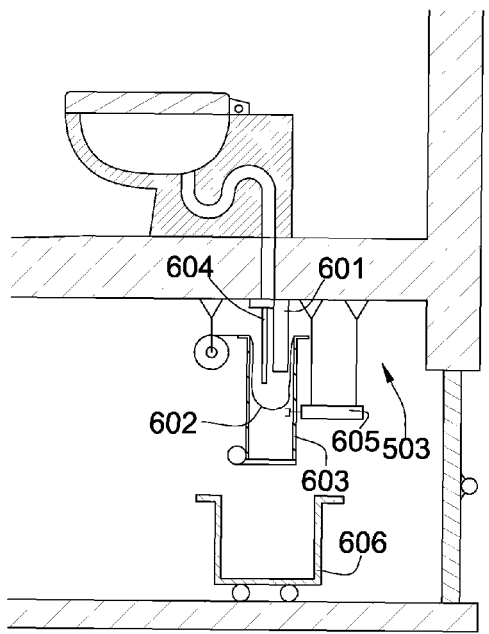
FIG. 7a is a cross-sectional diagram of another embodiment of a waste disposal system of the water closet.
Figure 7B:
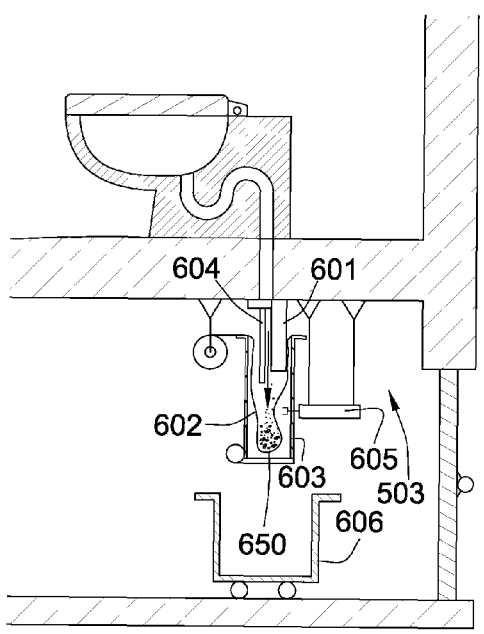
FIG. 7b is a cross-sectional diagram of another embodiment of a waste disposal system of the water closet.
Figure 7C:
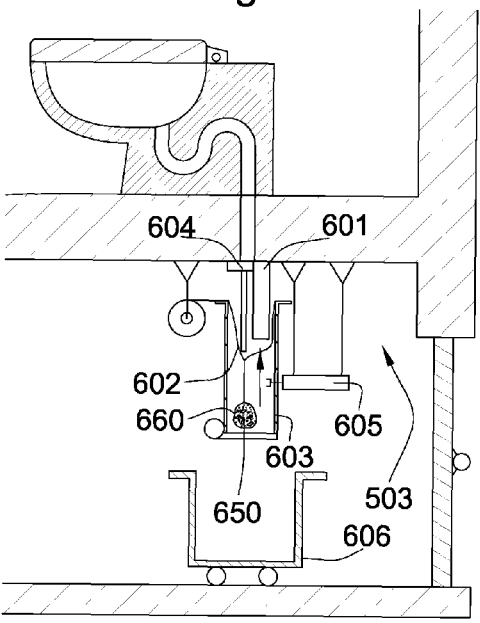
FIG. 7c is a cross-sectional diagram of another embodiment of a waste disposal system of the water closet.
Figure 7D:
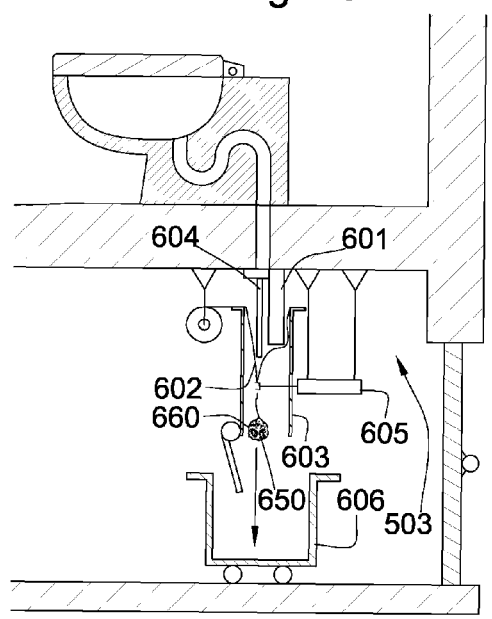
FIG. 7d is a cross-sectional diagram of another embodiment of a waste disposal system of the water closet.

Referring now to FIGS. 5 through 6d, the water 450 used in the wash basin 203 and by the shower 403 may drain into a series of filters 501 where the water is filtered and cleaned for reuse. Once the water 450 has been cleaned by the series of filters 501 the water 450 may be transferred back to the shower 403 and the wash basin 203 by a pump 502. The water closet 101 may also comprise a waste disposal system 503 adapted to prepare waste 650 deposited in the toilet 201 for safe removal from the water closet 101. The waste disposal system 503 may comprise a vacuum tube 603 disposed below a toilet drain pipe 601. A disposable sheet 602 may be placed intermediate the toilet drain pipe 601 and the vacuum tube 603 and may be adapted to catch the waste 650 as it exits the toilet drain pipe 601. The disposable sheet 602 may comprise a material selected from a group consisting of plastic, cellulose, cellophane, paper or combinations thereof. A vacuum pump 604 in communication with the vacuum tube 603 is activated creating a vacuum in the vacuum tube 603. It is anticipated that the vacuum in the vacuum tube 603 will draw the disposable sheet 602 and the waste 650 into the vacuum tube 603. As the disposable sheet 602 and the waste 650 are drawn into the vacuum tube 603 the disposable sheet 602 forms into a disposable receptacle 660 enveloping the waste 650. The waste disposal system 503 may comprise a sealer 605 adapted to seal the disposable receptacle 660. The sealer 605 may comprise a hot surface adapted to seal the disposable receptacle 660 by melting an opening of the disposable receptacle 660 shut. Once the waste 650 is sealed in the disposable receptacle 660, the disposable receptacle 660 may be placed in a sack 606 or can 606 for future removal.

Referring now to FIGS. 7a through 7d, the vacuum pump 604 may be adapted to remove air from the disposable receptacle 660 before the sealer 605 seals the waste 650 in the disposable receptacle 660. Referring to FIGS. 8a through 8b, the waste disposal system 503 may comprise a motor 801 adapted to twist a portion 802 of the disposable receptacle 660. It is believed that the motor 801 may isolate waste 650 deposited in the disposable receptacle 660 by twisting the portion 802 of the disposable receptacle 660 containing the waste 650 thereby pinching the disposable receptacle 660 and isolating the portion 802 of the disposable 660 receptacle containing the waste 650 from the rest of the disposable receptacle 660. The motor 801 may form multiple isolated portions 802 in the disposable receptacle 660.

Figure 9:
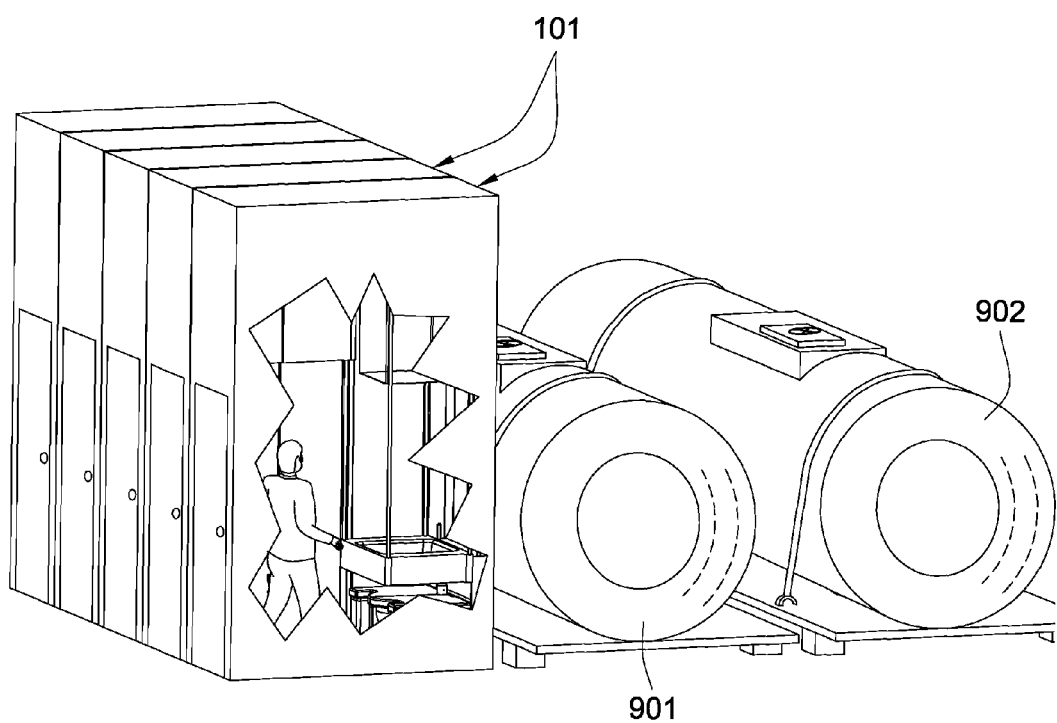
FIG. 9 is a perspective diagram of an embodiment of a plurality of water closets attached to a water reservoir and a waste reservoir.
Figure 10A:
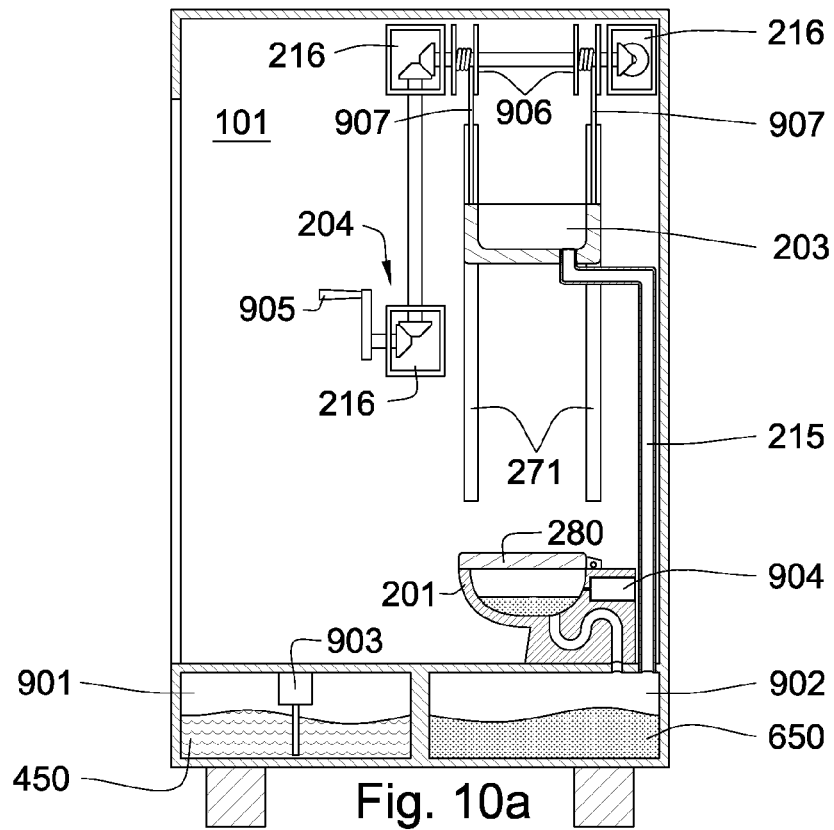
FIG. 10a is a cross-sectional diagram of another embodiment of a water closet.
Figure 10B:
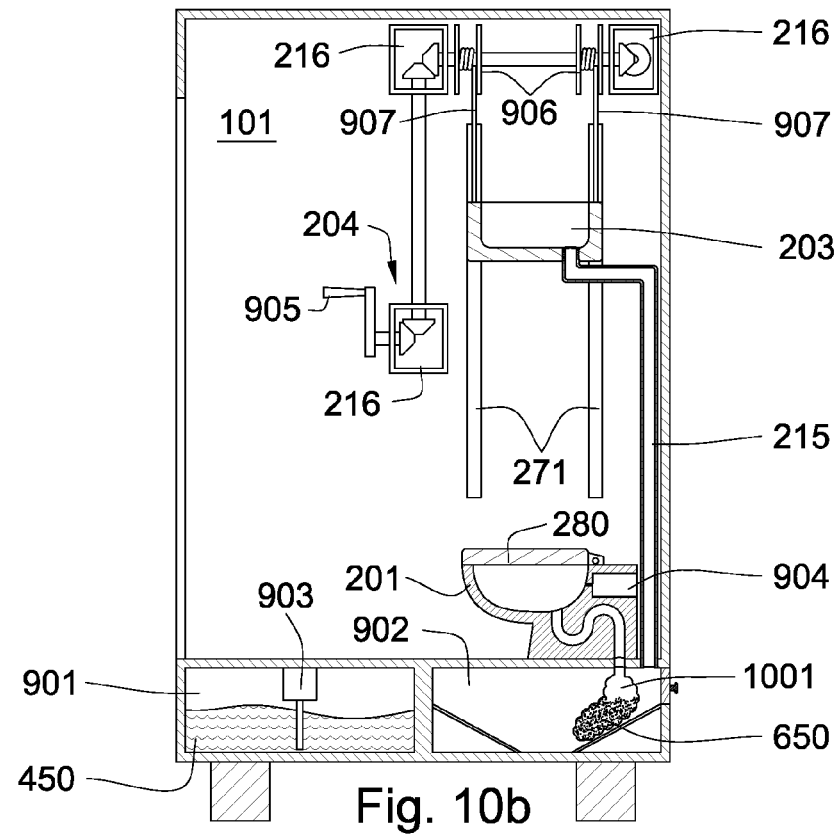
FIG. 10b is a cross-sectional diagram of another embodiment of a water closet.
Figure 11:
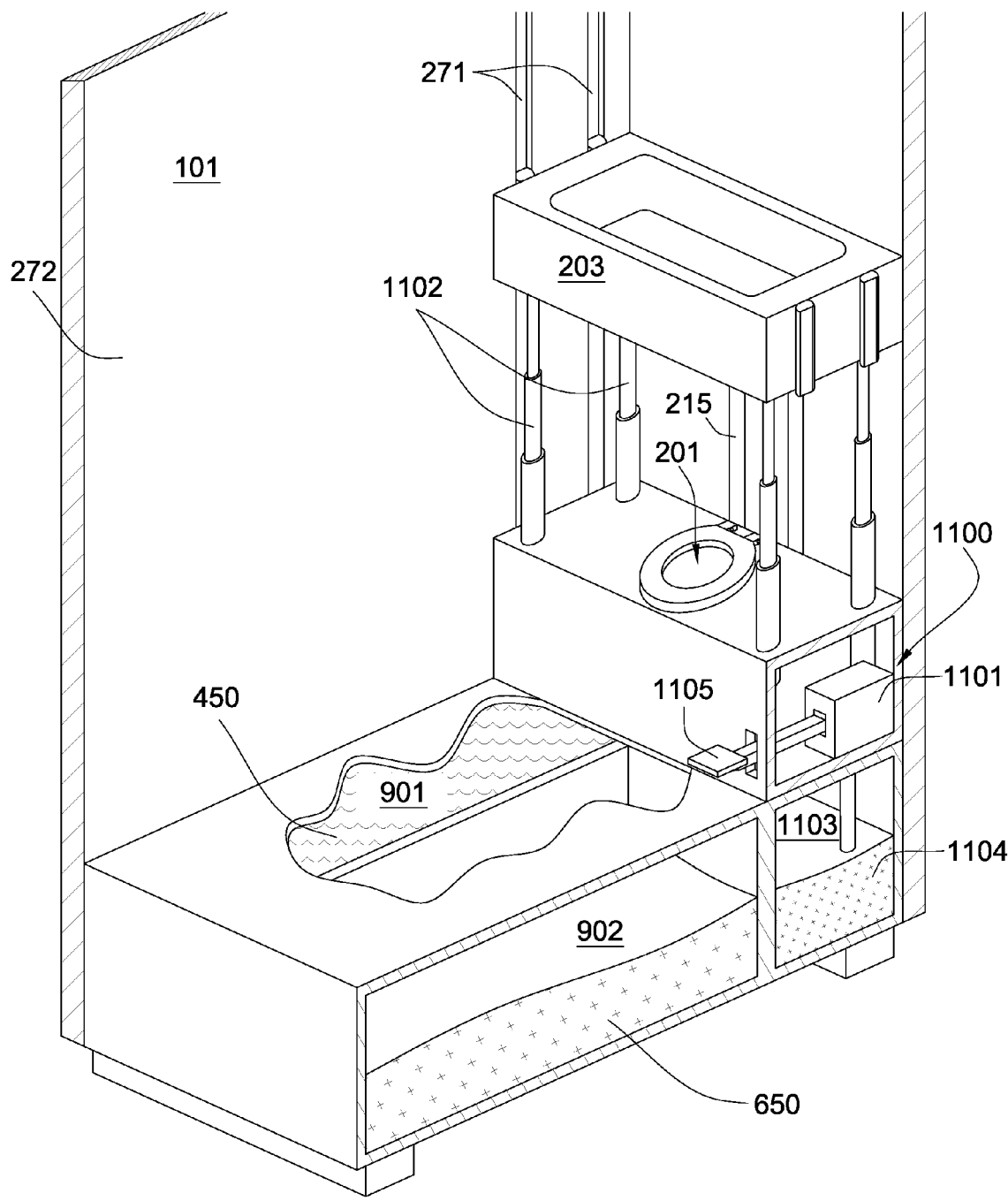
FIG. 11 is a perspective diagram of another embodiment of a water closet.

Referring now to FIGS. 9 through 11, the water closet 101 may be in communication with a waste reservoir 902 adapted to store waste 650 and the water closet 101 may be in communication with a water reservoir 901 adapted to provide water 450 to the water closet 101. A plurality of water closets 101 may be in communication with as few as one water reservoir 901 and one waste reservoir 902 such as in the embodiment disclosed in FIG. 9. The water reservoir 901 and the waste reservoir 902 may be incorporated into the water closet 101. The water closet 101 may comprise a water pump 903 adapted to transport water 450 from the water reservoir 901 to the wash basin 203 and/or toilet 201. A compressed gas canister 904 may be incorporated into the toilet 201 and is adapted to assist in flushing the toilet 201. The compressed gas canister 904 may release a compressed gas into the toilet 201 thereby forcing the fluid and waste in the toilet 201 down the drain of the toilet 201. It is believed that the compressed gas canister 904 may reduce the amount of water necessary to flush the toilet 201. The waste reservoir 902 may comprise a liner 1001 disposed intermediate the waste stored in the waste reservoir 902 and the waste reservoir 902 walls. The liner 1001 may expand in volume as the volume of the waste disposed in the waste reservoir 902 increases. The actuator 204 may comprise a crank 905 adapted to actuate at least one reel 906 of line 907 in communication with the wash basin 203 and disposed above the wash basin 203. At least one gear box 216 may be disposed intermediate the crank 905 and the at least one reel 906 of line 907. As the crank 905 is turned the at least one reel 906 may draw in line 907 thereby raising the wash basin 203 away from the toilet 201. Some embodiments the water closet 101 may be adapted to receive water 450 from an outdoor water faucet.

The actuator 204 may comprise a hydraulic jack 1100. The hydraulic jack 1100 may comprise a hydraulic pump 1101 adapted to pump hydraulic fluid 1104 disposed in a hydraulic fluid chamber 1103 located in the water closet 101 into at least one hydraulic piston 1102 disposed below the wash basin 203. As the hydraulic pump 1101 pumps hydraulic fluid 1104 into the at least one hydraulic piston 1102 the at least one hydraulic piston 1102 raises the wash basin 203 away from the toilet 201. To lower the wash basin 203 toward the toilet 201, hydraulic fluid 1104 may be transferred from the at least one hydraulic piston 1102 to the hydraulic fluid chamber 1103. The hydraulic jack 1100 may comprise a mechanical lever 1105 that may be used by a person in the water closet 101 to manipulate the hydraulic jack 1100. The actuator 204 may also comprise a mechanical jack, a hydraulic jack, a motor, or combinations thereof. The water closet 101 may comprise a power source adapted to power the actuator 204. The power source may comprise a battery, a generator, a solar cell, or combinations thereof The power source may also be used to provide power to the water pump 903.

Figure 12A:
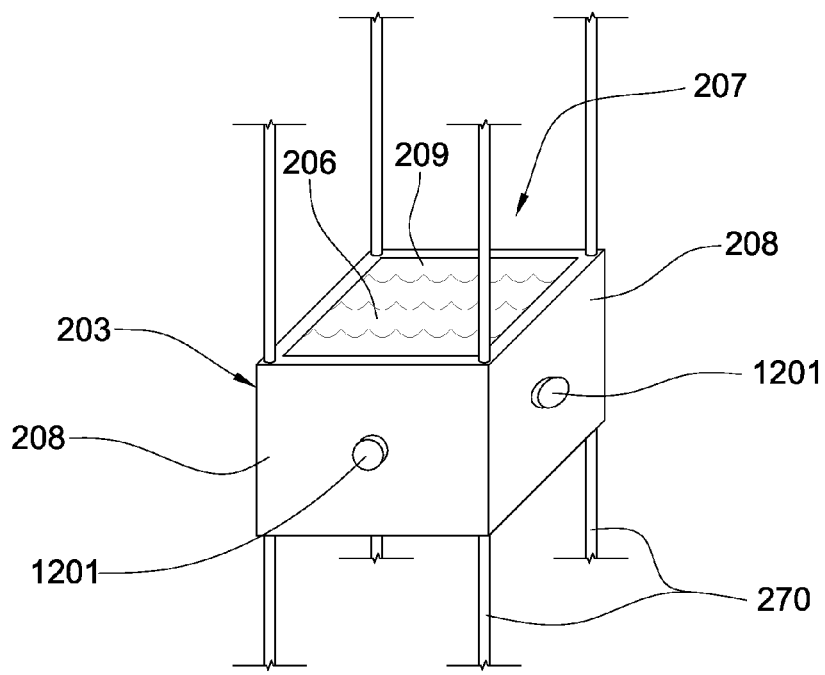
FIG. 12a is a perspective diagram of an embodiment of a wash basin with at least one ultrasonic transducer.
Figure 12B:
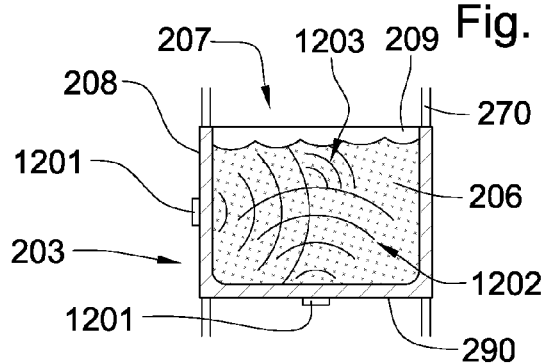
FIG. 12b is a cross-sectional diagram of another embodiment of a wash basin with at least one ultrasonic transducer.
Figure 12C:
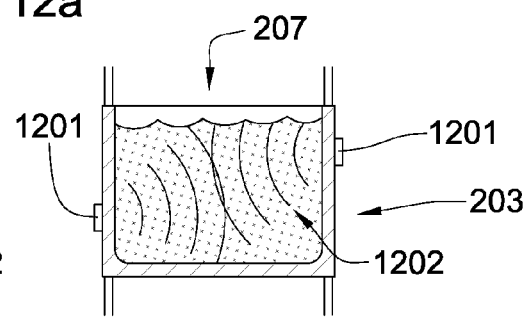
FIG. 12c is a cross-sectional diagram of another embodiment of a wash basin with at least one ultrasonic transducer.
Figure 12D:
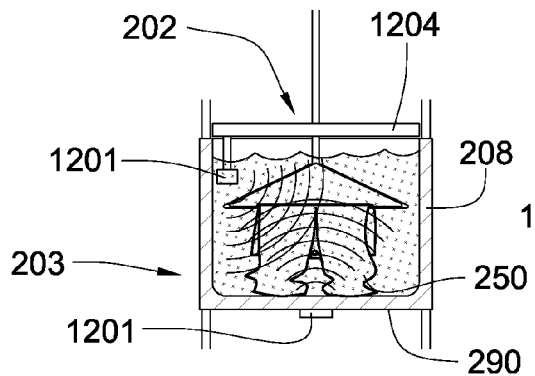
FIG. 12d is a cross-sectional diagram of another embodiment of a wash basin with at least one ultrasonic transducer.
Figure 12E:
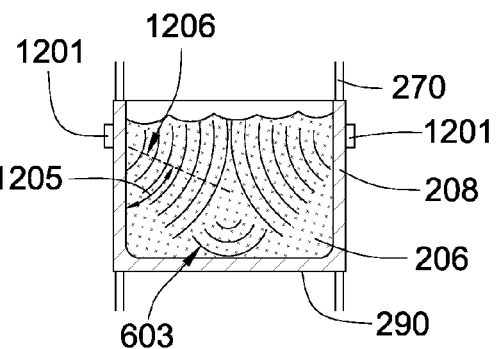
FIG. 12e is a cross-sectional diagram of another embodiment of a wash basin with at least one ultrasonic transducer.

Referring now to FIGS. 12a though 12e, the wash basin 203 comprises at least one ultrasonic transducer 1201 adapted to transmit a wave 1202 through the liquid medium 206 when the liquid medium 206 is disposed within the wash basin 203. FIGS. 12a through 12b disclose embodiments wherein the at least one ultrasonic transducer 1201 may be mounted on a side 208 of the wash basin 203 and a second ultrasonic transducer 1201 may be mounted on a contiguous side 208 of the wash basin 203. The contiguous side 208 may comprise any side 208, including the closed bottom side 290, that is contiguous with the side 208 where the at least one ultrasonic transducer 1201 is mounted. The wave 1202 transmitted by the at least one ultrasonic transducer 1201 may interact with the wave 1202 transmitted by the second ultrasonic transducer creating constructive interference waves 1203. FIG. 12c discloses an embodiment wherein the second ultrasonic transducer 1201 and the at least one ultrasonic transducer 1201 are mounted on opposing sides 208. The second ultrasonic transducer 1201 may be mounted at a different height than the at least one ultrasonic transducer 1201. It is believed that mounting the at least one ultrasonic transducer 1201 and the second ultrasonic transducer 1201 at different heights on the sides 208 of the wash basin 203 may reduce destructive interference between the wave 1202 transmitted by the at least one ultrasonic transducer 1201 and the wave 1202 transmitted by the second ultrasonic transducer 1201. FIG. 12d discloses an embodiment wherein the at least one ultrasonic transducer 1201 may be mounted to the holder 202. The holder 202 may comprise a lid 1204 adapted to cover the open top 207 of the wash basin 203 after the holder 202 is inserted into the wash basin 203. The at least one ultrasonic transducer 1201 may be adapted to transmit the wave 1202 through the liquid medium 206 with an angle 1205 greater than or less than 90 degrees between a central axis 1206 of the wave 1202 and the side 208 of the wash basin 203. It is believed that the ultrasonic transducers 1201 may clean the object 250 efficiently using a liquid medium 206 that is surfactant-free. The water closet 101 may comprise a control loop adapted to obstruct the drain 601 of the wash basin 203 while the ultrasonic transducers 1201 are activated.

Figure 13A:
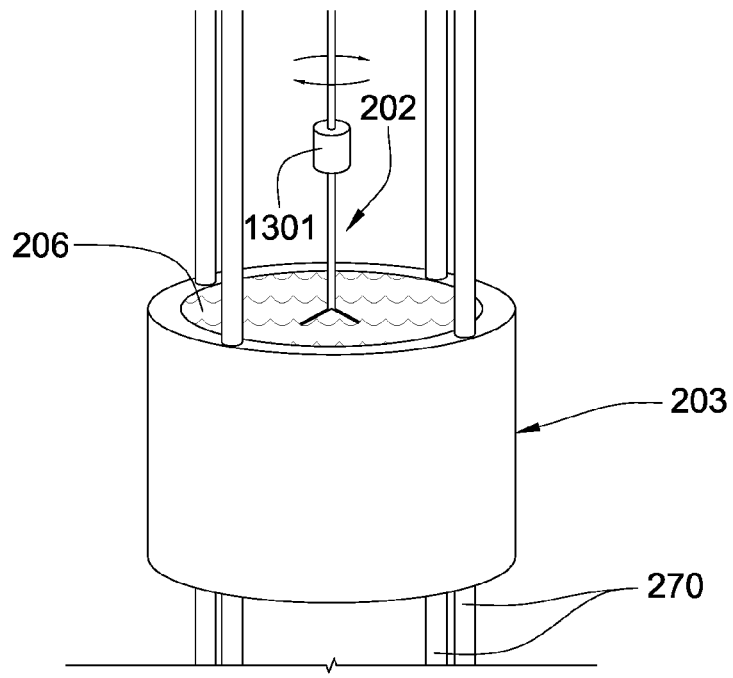
FIG. 13a is a perspective diagram of an embodiment of a holder with an agitator.
Figure 13B:
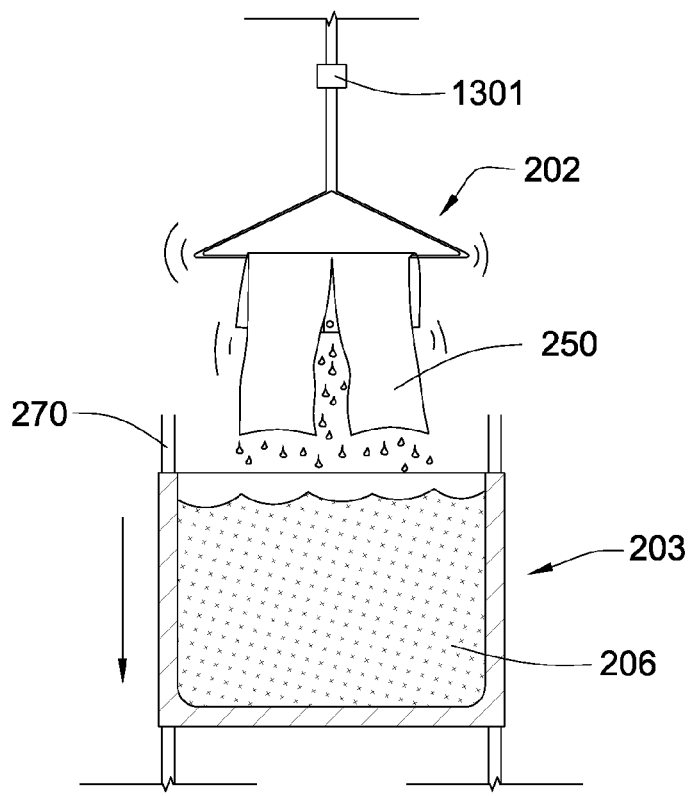
FIG. 13b is a cross-sectional diagram of another embodiment of a holder with an agitator.

Referring now to FIGS. 13a through 13b, the holder 202 may comprise an agitator 1301 adapted to vibrate the holder 202. When the first motor 210 is activated the holder 202 is lowered and the object 250 is placed on the holder 202. The first motor 210 is activated and the holder 202 and the object 250 are raised and are enveloped within the splash guard 205. The second motor 213 is activated and actuates the guide 214 raising the wash basin 203 towards the holder 202 and the object 250. The drain 215 is obstructed and the wash basin 203 is filled with the liquid medium 206. The first motor 210 is activated and the holder 202 and the object 250 are lowered into the liquid medium 206 in the wash basin 203. The ultrasonic transducers 1201 are activated transmitting waves 1202 through the liquid medium 206 which cleans the object 250. The agitator 1301 may also be activated when the ultrasonic transducers 1201 are activated. It is believed that using the agitator 1301 to vibrate the holder 202 and object 250 while the holder 202 and object 250 are disposed in the liquid medium 206 may assist in the cleaning of the object 250. The agitator 1301 may also comprise an ultrasonic transducer adapted to transmit a wave through the liquid medium 206. After the object 250 has been cleaned, the ultrasonic transducers 1201 are deactivated, the first motor 210 is activated and the holder 202 and the object 250 are raised above and out of the liquid medium 206 and wash basin 203. The agitator 1301 may be activated to vibrate the holder 202 and object 250. The splash guard 205 may direct moisture released from the vibrating object 250 into the wash basin 203. It is believed that vibrating the holder 202 and the object 250 after they have been raised above and out of the liquid medium 206 may help the object 250 release moisture that may have been soaked up by the object 250 thereby minimizing the amount of drying time required by the object 250. The drain 215 is opened and the liquid medium 206 is drained from the wash basin 203. The second motor 213 is activated and actuates the guide 214 lowering the wash basin 203 away from the holder 202 and the object 250. The first motor 210 is activated and the holder 202 is lowered and the clean object 250 is removed from the holder 202. The holder 202 may be adapted to hold a plurality of objects 250 spaced 0.125 inches to 1.0 inches apart. It is believed that spacing the objects 250 0.125 inches to 1.0 inches apart may allow the waves 1202 transmitted by the at least one ultrasonic transducer 1201 to more effectively scrub the objects 250.

Figure 14:
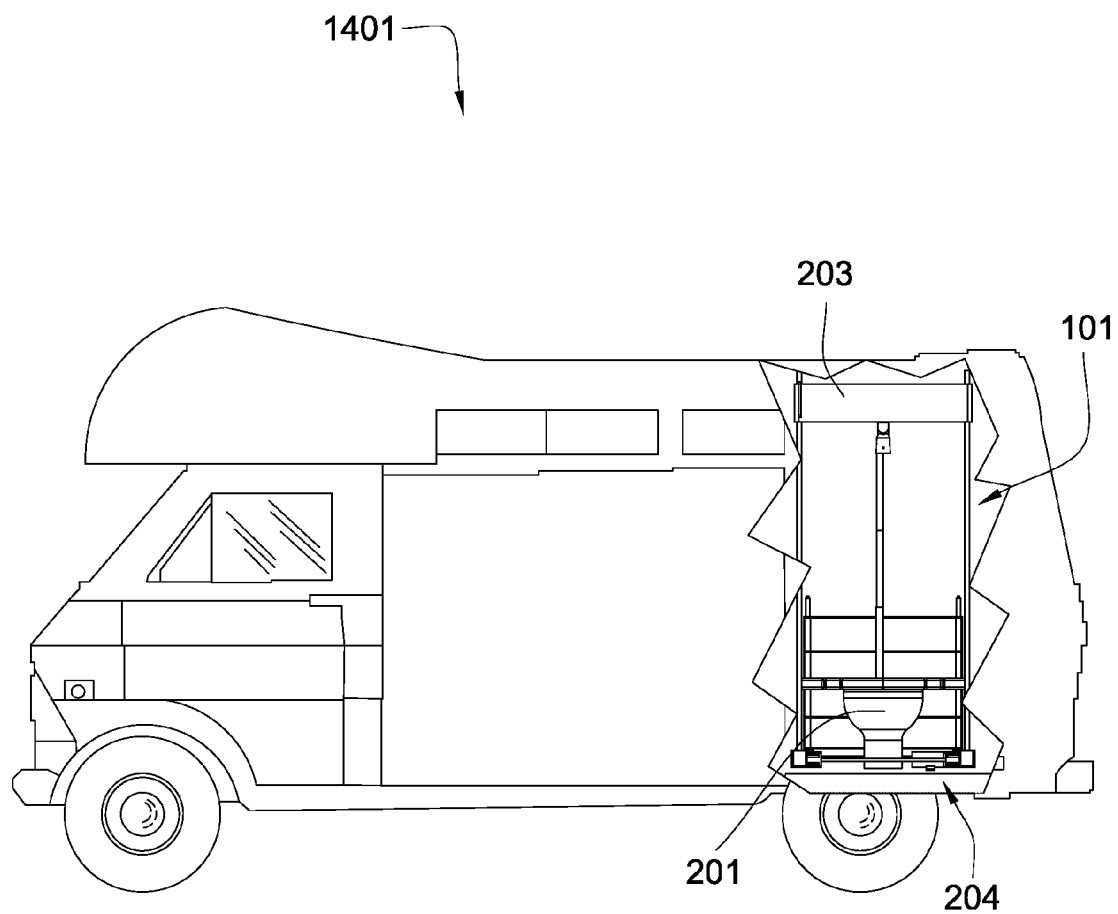
FIG. 14 is a perspective diagram of an embodiment of a water closet incorporated into a motorhome.
Figure 15A:
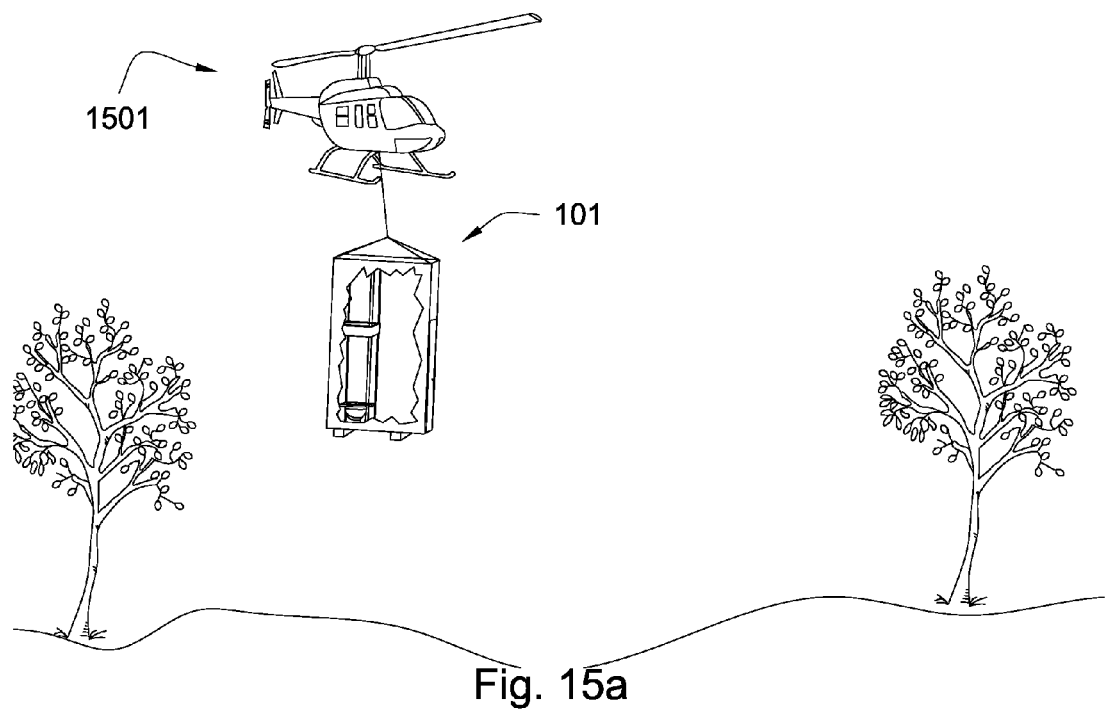
FIG. 15a is a perspective diagram of an embodiment of a water closet transported by a helicopter.
Figure 15B:
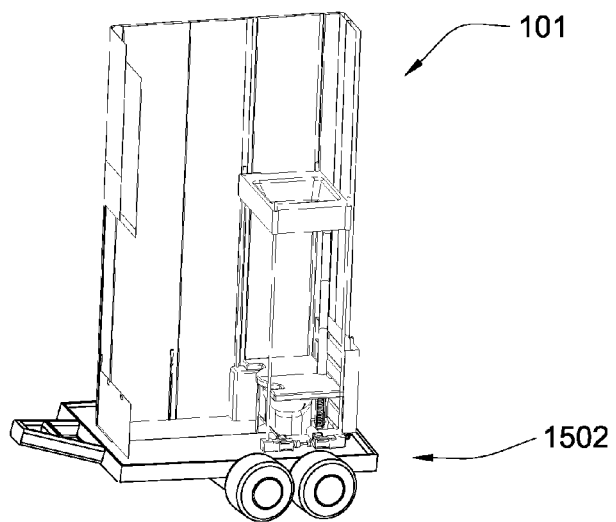
FIG. 15b is a perspective diagram of an embodiment of a water closet mounted on a trailer.

Referring now to FIGS. 14 through 15b, the water closet 101 may be incorporated into a spacecraft, a motorcraft, a watercraft, an aircraft, or combinations thereof. FIG. 14 discloses an embodiment wherein the water closet 101 has been incorporated into a motorhome 1401. It is believed that the water closet 101 may be beneficial in a spacecraft, a motorcraft, a watercraft, and/or an aircraft in that the water closet 101 may require less space than embodiments of water closets found in the prior art. The water closet 101 may be adapted to be transported as a unit comprising only the water closet 101. The water closet 101 may also be adapted to function as a stand alone building. It is believed that the water closet 101 may be beneficial when adapted to function as a stand alone building in such cases as natural disaster relief or rural locations with little infrastructure. The water closet 101 may be adapted to be transported on a trailer, by a helicopter, by a forklift, on a truck or combinations thereof. FIG. 15a discloses an embodiment wherein the water closet 101 is transported by a helicopter 1501. FIG. 15b discloses an embodiment wherein the water closet 101 is transported by a trailer 1502.

FIG. 16 is a method 1600 of an embodiment for washing an object and may include the steps of providing 1601 a holder, a wash basin, an actuator adapted to move the wash basin and/or the holder with respect to one another, at least one ultrasonic transducer adapted to transmit a wave through a liquid medium when disposed within wash basin, and a liquid medium disposed within the wash basin; object is connected 1602 to the holder; the actuator brings 1603 the wash basin and holder together such that the object is disposed in the liquid medium within the wash basin; the at least one ultrasonic transducer is activated 1604 and transmits waves through the liquid medium cleaning the object; the actuator separates 1605 the holder and wash basin removing the object from the liquid medium; and the object is dried 1606 and removed from the holder.

FIG. 17 is a method 1700 of an embodiment for using a water closet and may include the steps of providing 1701 a toilet disposed in a water closet and secured to the floor of the water closet, and a wash basin positioned above the toilet; 1702 raising the wash basin to a height necessary for a person to sit on the toilet and underneath the wash basin; 1703 flushing the toilet; 1704 and lowering the wash basin to a height disposed intermediate a shoulder and a torso of the person and adapted to allow the person to wash in the basin.

Whereas the present invention has been described in particular relation to the drawings attached hereto, it should be understood that other and further modifications apart from those shown or suggested herein, may be made within the scope and spirit of the present invention.

What is claimed is:
1. A water closet comprising:
   a wash basin positioned above a toilet;
   the toilet is secured to a floor;

a guide comprising at least one rail in communication with at least a corner of the wash basin; and the guide is adapted to direct movement of the wash basin along the length of the at least one rail.

2. The water closet of claim 1, wherein at least one ultrasonic transducer is disposed on the wash basin.

3. The water closet of claim 2, wherein the water closet comprises a control loop adapted to obstruct a drain of the wash basin while the ultrasonic transducers are activated.

4. The water closet of claim 1, wherein the water closet comprises a holder positioned above the wash basin.

5. The water closet of claim 1, wherein an actuator is adapted to move the wash basin and the holder with respect to one another.

6. The water closet of claim 5, wherein at least one gear box is disposed intermediate a rail of the guide and the actuator.

7. The water closet of claim 5, wherein the actuator is a mechanical jack, a hydraulic jack, a motor, a crank or combinations thereof.

8. The water closet of claim 5, wherein a power source adapted to provide power to the actuator is incorporated into the water closet.

9. The water closet of claim 8, wherein the power source comprises a battery, a generator, a solar cell or combinations thereof.

10. The water closet of claim 1, wherein the guide comprises grooves of at least one wall of the water closet.

11. The water closet of claim 1, wherein the water closet is adapted to function as a stand alone building.

12. The water closet of claim 1, wherein the water closet is incorporated into a spacecraft, a motorcraft, a watercraft, an aircraft, or combinations thereof.

13. The water closet of claim 1, wherein the water closet is incorporated into a portable building, a residential dwelling, a commercial building, or combinations thereof.

14. The water closet of claim 1, wherein a bench adapted to cover the toilet is in communication with the guide and is adapted to be lifted vertically above the toilet.

15. The water closet of claim 1, wherein the water closet comprises a water pump adapted to transport water from a water reservoir disposed within the water closet to the wash basin and/or toilet.

16. The water closet of claim 1, wherein a compressed gas canister is disposed in the toilet and is adapted to assist in flushing the toilet.

17. The water closet of claim 1, wherein a water stopper is placed in a lower half of an entrance to the water closet and is adapted to retain water within the water closet.

18. The water closet of claim 1, wherein the wash basin is a sink.

19. The water closet of claim 1, wherein the wash basin is a washing machine.

* * * * *